United States Patent

Mason et al.

[19]

[11] Patent Number: 5,909,173
[45] Date of Patent: Jun. 1, 1999

[54] VEHICLE WARNING DEVICE

[76] Inventors: J. Bradley Mason, 221 Doulton Way, Columbia, S.C. 29212; Thomas W. Olliver, III, 3464 Township Ridge Pt., Marietta, Ga. 30066; Kenneth S. Watkins, Jr., 372 River Dr., Dahlonega, Ga. 30533

[21] Appl. No.: 08/803,630

[22] Filed: Feb. 21, 1997

[51] Int. Cl.⁶ .................................................. B60Q 1/50
[52] U.S. Cl. ........................ 340/467; 340/463; 340/471; 340/479; 200/61.45 R
[58] Field of Search .................................... 340/467, 463, 340/468, 471, 472, 479, 464; 200/61.45 R, 61

[56] References Cited

U.S. PATENT DOCUMENTS

| | | | |
|---|---|---|---|
| 2,698,403 | 12/1954 | Woodham | 340/464 |
| 3,501,742 | 3/1970 | Ellison | 340/463 |
| 3,702,459 | 11/1972 | Bauchan | 340/62 |
| 3,748,643 | 7/1973 | Jacobs | 340/71 |
| 5,309,141 | 5/1994 | Mason et al. | 340/467 |
| 5,442,333 | 8/1995 | Bailey | 340/467 |

Primary Examiner—Thomas J. Mullen, Jr.
Assistant Examiner—Julie B. Lieu
Attorney, Agent, or Firm—Kenneth S. Watkins, Jr.

[57] ABSTRACT

A vehicle warning device comprises a visual indicator activated by a deceleration sensor upon emergency deceleration of the vehicle. The visual indicator is powered by a base inserted into a vehicle lamp socket. In the preferred embodiment, the base is part of an adapter comprising an adapter socket for receiving the vehicle lamp. The adapter allows installation of the warning device by simply plugging the adapter into the vehicle lamp socket without wiring or mounting changes to the vehicle. The preferred embodiment comprises a stroboscope for providing a highly visible indication of an emergency braking state.

19 Claims, 6 Drawing Sheets

VEHICLE WARNING DEVICE

BACKGROUND OF THE INVENTION

The present invention relates to safety devices for automobiles and, more particularly, to visual indicators of emergency braking of a vehicle.

Every year people are killed and injured in automobile accidents. In the United States alone, 43,900 people are were killed in 1995 and 6,025,000 people were injured according to the Insurance Institute. Economic loss totaled $115,625,000.

Many accidents result when vehicles are traveling in the same direction and the "following" vehicle crashes into the "lead" vehicle. The driver in a following vehicle often does not realize the lead vehicle is stopping quickly. The driver in the following vehicle fails to respond in enough time to avoid a rear-end collision.

If the lead vehicle were equipped with a device that indicated very rapid deceleration, the driver in the following vehicle would have the maximum warning and many accidents could be averted.

The present invention relates to a deceleration warning device for vehicles. Although deceleration warning devices have been disclosed in the past, the prior devices suffer limitations which have prevented widespread use.

U.S. Pat. No. 5,309,141 discloses an emergency deceleration warning device comprising an enclosed decelerometer for enabling a flasher-operating circuit. The device is mounted in the auxiliary brake light position of an automobile. Such a unit requires the installation of wiring to obtain power and brake light indication when installed as a retrofit in an existing automobile. Locating the device in the vicinity of the rear window would require special mounting considerations.

U.S. Pat. No. 5,442,333 discloses an urgent braking device which incorporates a power modulating means connected in parallel with an inertial switch. The switch opens when the vehicle is decelerating in excess of a predetermined rate, activating the power modulating means and flashing the brake lights. The device requires wiring modification of the vehicle in order to install as a retrofit in an existing automobile. The device also requires attaching to a structure of the vehicle.

These and other devices disclosed to warn following vehicles of an emergency braking action require various degrees of wiring and/or structural modification in order to install the units as a retrofit to existing vehicles. Time and costs of installing the devices may be prohibitive.

OBJECTS AND SUMMARY OF THE INVENTION

Therefore an object of the present invention is to provide a vehicle warning device which provides a visual indication of an emergency braking condition to following drivers.

A further object of the present invention is to provide a vehicle warning device which does not require wiring or structural changes to a vehicle in order to retrofit the device.

A further object of the present invention is to provide a vehicle warning device which installs quickly in virtually any vehicle.

A further object of the present invention is to provide a vehicle warning device which may be installed as original equipment in new vehicles.

A further object of the present invention is to provide a vehicle warning device which can utilize a number of different illuminating methods.

Yet another object of the present invention is to provide a vehicle warning device which has a low purchase cost and little if any installation cost.

Yet another object of the present invention is to provide a vehicle warning device that can be installed by the vehicle owner with no knowledge of vehicle electrical circuits or wiring.

The device comprises a warning indicator which is activated by a deceleration sensor upon sensing an excessive deceleration rate. Power to the warning indicator is provided by a base insertable into a vehicle lamp socket. In the preferred embodiment, the vehicle lamp socket is the brake light socket.

Installation of the device requires only insertion of the device in the brake light socket of the vehicle. The deceleration sensor is automatically aligned when the device is inserted into the socket. The normal brake light may be inserted into an auxiliary socket provided on the device. No wiring or additional structural elements are required. Simplicity of mounting allows vehicle owners to install and use the device without knowledge of vehicle wiring, reducing cost and time to have the device installed at a garage.

The warning device may be installed into one or more of the brake light sockets including the third central brake light on newer vehicles. If only one device is installed, the preferred location is the driver's side brake light.

In the preferred embodiment, the warning indicator is a stroboscope which provides an intense, flashing indication to a driver of a following vehicle. In other embodiments, high intensity light emitting diodes (LEDs) or high intensity incandescent lamps may be used. Also, the brake lamp itself may provide the warning indication by use of an accelerometer activated flasher.

The easy-to-use features of the current invention represent a convenience to the user. In addition, the easy-to-use nature of the current invention would allow many people to retrofit their vehicle with an important safety device. Therefore, an important safety device could be installed into many cars quickly and cheaply, playing a significant part in reducing personal injury and property loss due to rear-end collisions.

BRIEF DESCRIPTION OF THE DRAWINGS

These and other features, aspects and advantages of the present invention will become better understood with regard to the following description, appended claims and accompanying drawings where:

DESCRIPTION OF THE PREFERRED EMBODIMENTS

The following is a description of the preferred embodiments of a vehicle warning device capable of detecting an emergency braking action and of providing a visual indication to a driver in a following vehicle.

Figure 1:
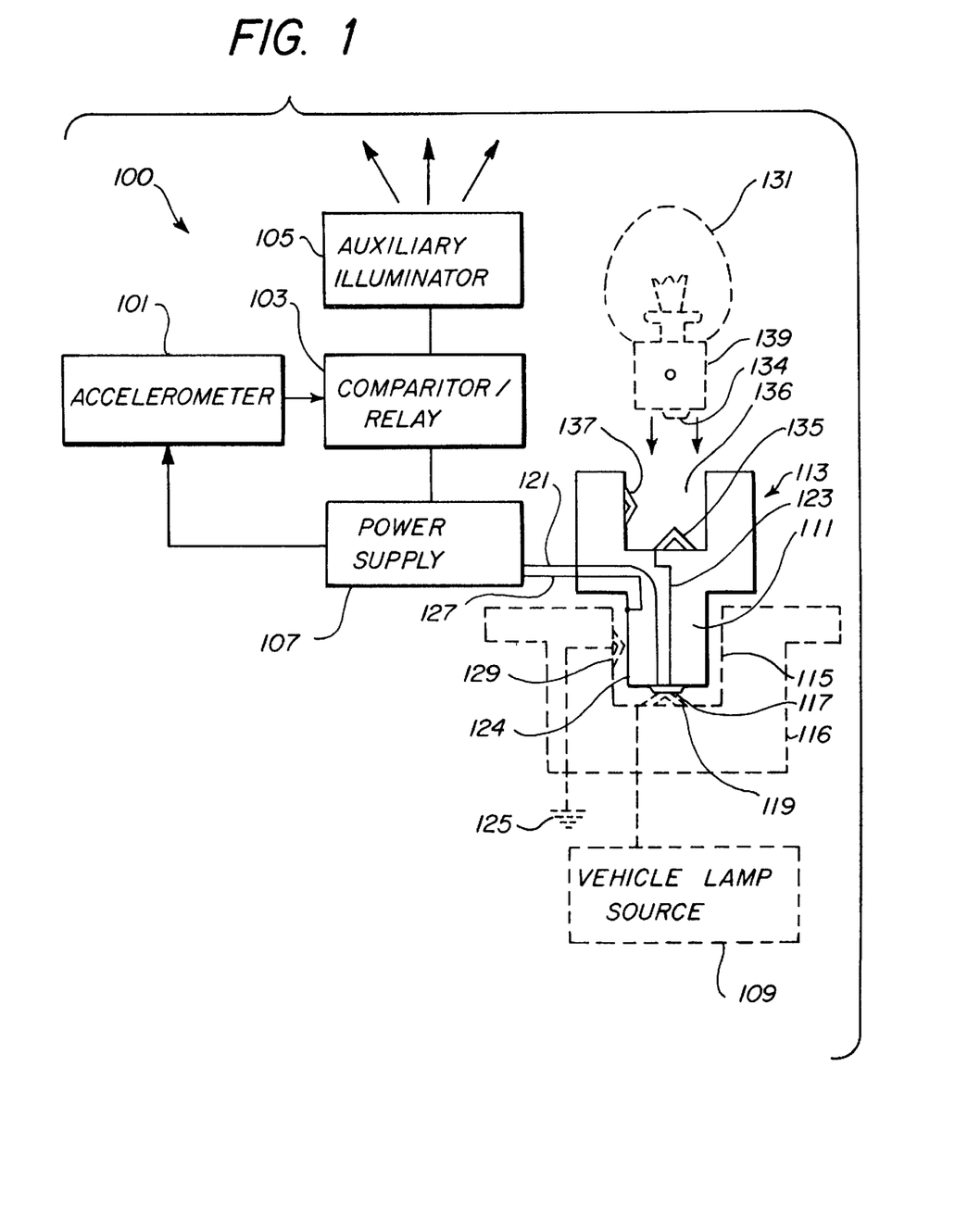
FIG. 1 is a schematic block diagram of the preferred embodiment of the vehicle warning device comprising an adapter with a base insertable in a vehicle lamp socket, the adapter comprising an auxiliary illuminator, the vehicle lamp source, vehicle lamp socket and lamp shown in broken lines.

FIG. 1 is a block diagram of embodiment 100 of the vehicle warning device comprising an accelerometer 101 which acts as a deceleration sensor. The output of accelerometer 101 is connected to a comparator/relay 103 which energizes an auxiliary illuminator 105 through a power supply 107 when a signal representing a predetermined value of deceleration is detected from accelerometer 101. Power supply 107 supplies the required voltage to accelerometer 101, comparator/relay 103 and auxiliary illuminator 105 through comparator/relay 103. Power supply 107, comparator/relay 103 and auxiliary illuminator 105 comprise a warning indicator actuated by accelerometer 101 and powered by an adapter base supply contact 117.

Base 111 of adapter 113 provides a current path from vehicle lamp source 109 to power supply 107. When base 111 is inserted into vehicle lamp socket 115 of socket assembly 116, adapter base supply contact 117 engages vehicle socket supply contact 119 of vehicle lamp socket 115. Adapter base supply contact 117 supplies current to power supply 107 through conductor 121. Base outer shell 124 of base 111 also provides a ground or return path from power supply 107 to vehicle ground 125 through conductor 127 and vehicle socket ground contact 129. Adapter base supply contact 117 also supplies current to vehicle lamp 131 through conductor 123 and adapter socket supply contact 135 of adapter socket 136. Adapter socket supply contact 135 engages lamp supply contact 134 to energize vehicle lamp 131. Adapter socket ground contact 137 provides a ground path from lamp base 139 to vehicle ground 125 through base outer shell 124 and vehicle socket ground contact 129. Adapter socket ground contact 137 is electrically connected (not shown) to base outer shell 124.

Adapter 113 provides current to the power supply of the device without cutting or splicing any of the existing vehicle wiring. Adapter 113 also provides current to vehicle lamp 131.

In the preferred embodiment, auxiliary illuminator 105 comprises a warning indicator such as a stroboscope having a flash tube. Stroboscopes are known in the art and comprise a high-voltage power supply (not shown) and a trigger circuit (not shown) to provide a repeating, high-intensity flash.

In the preferred embodiment, accelerometer 101 is a solid state accelerometer such as a capacitive or piezzo electric accelerometer. In other embodiments, accelerometer 101 may be a deceleration switch such as a pendulum switch or mercury switch. In the preferred embodiment, accelerometer 101 is a single axis accelerometer. Power supply 107 provides the regulated voltage required by accelerometer 101.

Comparator/relay 103 provides a comparator or threshold circuit (not shown) for energizing auxiliary illuminator 105 through a relay when the signal representing a predetermined deceleration is achieved. In an alternative embodiment, the comparator circuit function is performed by accelerometer 101. The threshold value of accelerometer 101 output required for activation of vehicle warning device 100 may be varied to provide adequate warning of heavy braking without spurious alarms. In the preferred embodiment, the threshold value is 0.2 G to 0.5 G.

In the preferred embodiment, vehicle lamp source 109 is the brake light switch activated by brake application of the vehicle. Vehicle lamp socket 115 is the brake lamp socket and vehicle lamp 131 is the brake lamp. In other embodiments, vehicle lamp source 109 is the tail light switch and vehicle lamp socket 115 is the tail light socket. In this embodiment, auxiliary illuminator 105 may be activated only if the tail light is energized. This embodiment is especially useful in vehicles where the tail lights are energized whenever the ignition switch is on. Other embodiments utilize high-output LEDs or auxiliary incandescent bulbs for auxiliary illuminator 105. In still other embodiments, auxiliary illuminator 105 may include or, be replaced by, and auditory alarm such as the vehicle horn, or a separate siren or beeper.

Figure 2:
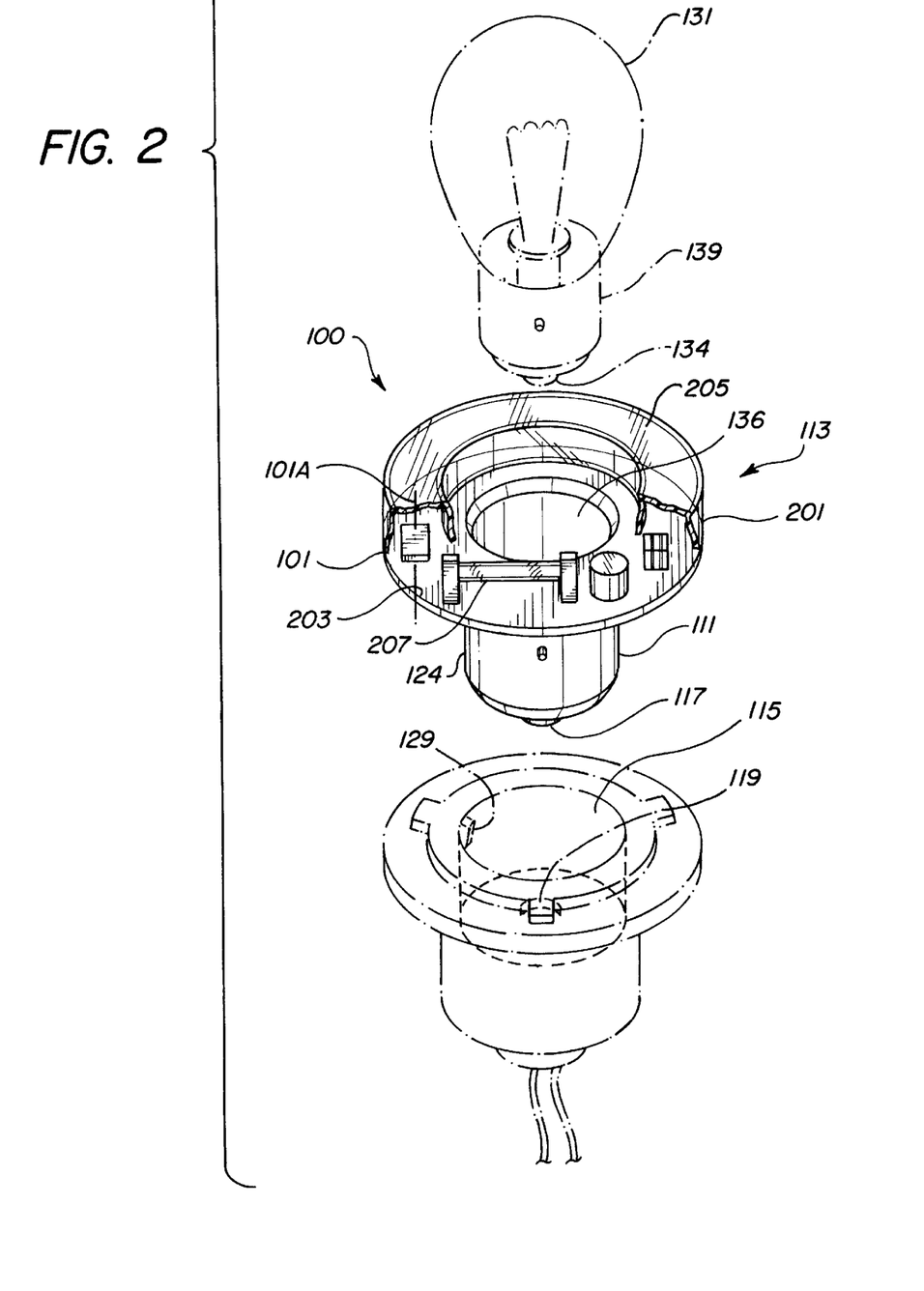
FIG. 2 is a perspective drawing of the embodiment of FIG. 1 showing the adapter insertable in a vehicle lamp socket and a vehicle lamp insertable in the adapter socket, the vehicle lamp socket and lamp shown in broken lines.

FIG. 2 is a perspective drawing of embodiment 100 of the vehicle warning device. Base 111 of adapter 113 plugs into vehicle lamp socket 115. Upon insertion, adapter base supply contact 117 of base 111 engages vehicle socket supply contact 119 of vehicle lamp socket 115 electrically to supply current to the power supply (not shown) disposed in case 201 of adapter 113. Accelerometer 101 is disposed on circuit board 203 of case 201 and aligned so that sensing axis 101A is aligned with the longitudinal axis (not shown) of the vehicle when base 111 of adapter 113 is inserted in vehicle lamp socket 115. Thus, accelerometer 101 is automatically aligned to sense braking of the vehicle when the base 111 is inserted into vehicle lamp socket 115. Transparent or translucent case cover 205 allows light emitted by flash tube 207 to be visible.

Adapter socket 136 is sized similar to vehicle lamp socket 115 to receive vehicle lamp 131. Lamp supply contact 134 engages adapter socket supply contact 135 (shown in FIG. 1) when vehicle lamp 131 is inserted and engaged in adapter socket 136. Lamp base 139 of vehicle lamp 131 engages adapter socket ground contact 137 of FIG. 1. Ground continuity is completed by base outer shell 124 of adapter base 111 engaging vehicle socket ground contact 129 of vehicle lamp socket 115. In this embodiment, the electronic components of FIG. 1 are located on circuit board 203 in adapter case 201.

Figure 3:
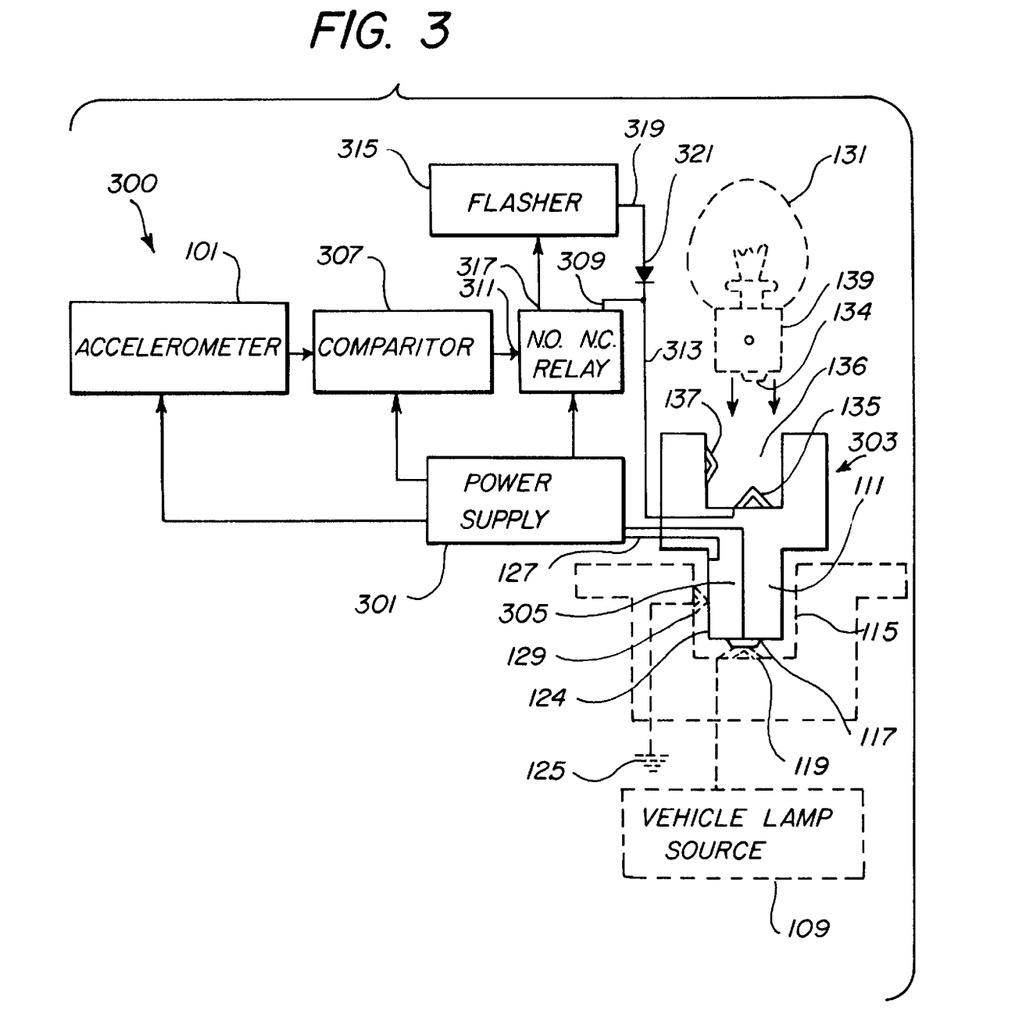
FIG. 3 is a schematic block diagram of an alternative embodiment of the vehicle warning device comprising a flasher to intermittently flash a vehicle lamp inserted into the adapter socket of the present invention, the vehicle lamp, vehicle lamp socket and vehicle lamp source shown in broken lines.

FIG. 3 is a schematic block diagram of embodiment 300 of the vehicle warning device. In this embodiment, flasher 315 supplying intermittent or pulsing current to vehicle lamp 131 serves as the warning indicator Current from vehicle lamp source 109 to power supply 301 is provided by base 111 of adapter 303. The current path comprises vehicle socket supply contact 119 of vehicle lamp socket 115, adapter base supply contact 117 and conductor 305. Ground return for power supply 301 is provided by conductor 127, base outer shell 124 and vehicle socket ground contact 129 of vehicle lamp socket 115.

Power supply 301 provides necessary operating voltage to accelerometer 101 and comparator 307. In normal operation, vehicle lamp 131 receives continuous current whenever vehicle lamp source 109 is energized through power supply 301 and the normally closed contact 309 of relay 311 and conductor 313. Upon emergency deceleration of the vehicle, the output of accelerometer 101 causes comparator 307 to switch states of relay 311, providing current from power supply 301 to flasher 315 through normally open relay contact 317. Output 319 of flasher 315 is a pulsing current which connects to vehicle lamp 131 through conductor 313. The pulsing current from flasher 315 causes vehicle lamp 131 to flash, increasing the visibility of vehicle lamp 131. Diode 321 prevents reverse current through flasher 315 when the normally closed contact 309 is closed.

Figure 4:
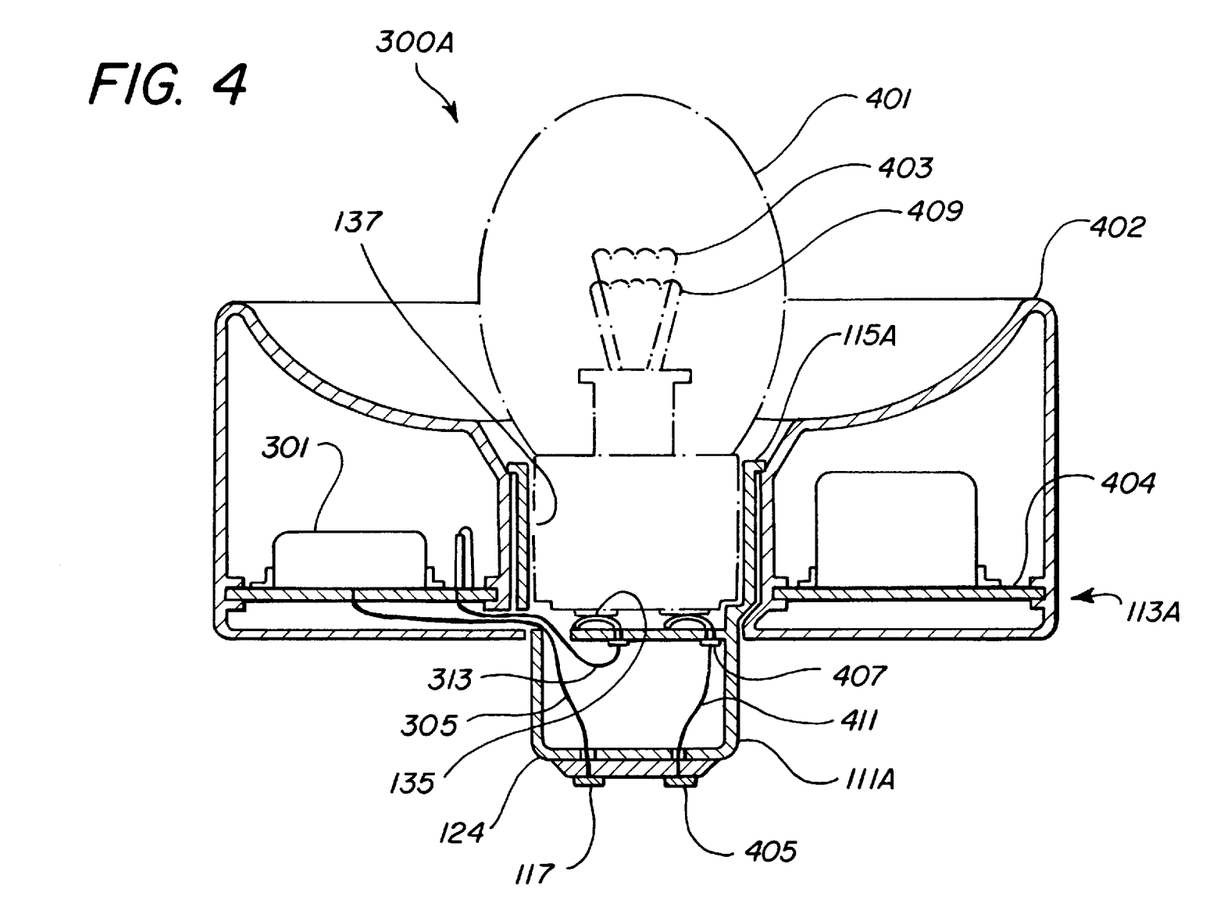
FIG. 4 is a cross section of an embodiment of the vehicle warning device showing a vehicle lamp inserted into the adapter socket, the lamp shown in broken lines.

FIG. 4 is a partial cross sectional view of embodiment 300A of the vehicle warning device utilizing a dual filament lamp 401. Conductor 305 provides a current path from adapter base supply contact 117 to power supply 301. Conductor 313 provides a current path from flasher 315 and relay 311 (FIG. 3) to filament 403 of dual filament lamp 401 through adapter socket supply contact 135. Auxiliary case 402 of adapter 113A attaches to adapter socket 115A and adapter base 111A and houses circuit board 404.

Base 111A of adapter 113A may contain an auxiliary adapter base supply contact 405 and an auxiliary adapter socket supply contact 407 to supply current to a second lamp filament 409 through conductor 411. This arrangement provides current for dual purpose automotive lamps comprising a filament for a brake light and a second filament for a tail light or turn signal.

Figure 5:
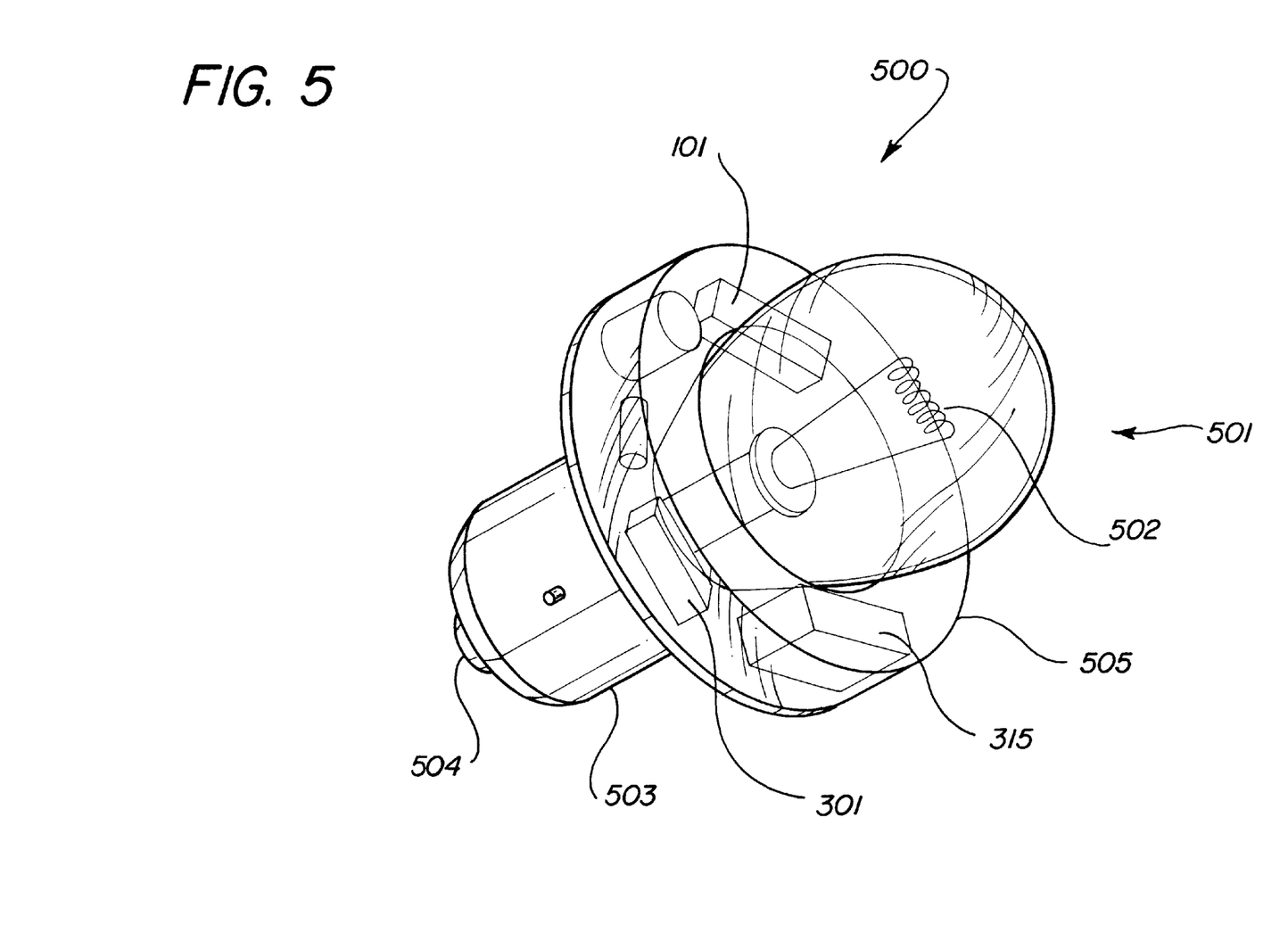
FIG. 5 is a perspective drawing of an embodiment of the vehicle warning device integrating the accelerometer and electronic components of the device with a vehicle lamp, the power to the flasher provided by the base of the lamp.

FIG. 5 is a perspective drawing of embodiment 500 of the vehicle warning device having components of embodiment 300 of FIG. 3 integral with lamp 501. In this embodiment, lamp base 503 comprises conductor 305 of FIG. 3 to supply current from the vehicle socket supply contact (119 of FIG. 3) to power supply 301 through base supply contact 504. Lamp base 503 also comprises conductor 313 of FIG. 3 to supply current to filament 502 of lamp 501 from flasher 315 or relay 311 (shown in FIG. 3). Accelerometer 101, flasher 315 and other electronic components are housed in an auxiliary case 505 surrounding the lower portion of lamp 501.

Embodiment 500 is used when clearances between the lamp and lens assembly (not shown) prevents use of adapter 303 of FIG. 3. A similar embodiment whereby the lamp base provides the power connections to the vehicle warning device power supply could be employed in embodiments such as that shown in FIG. 1 containing an auxiliary illuminator such as a flash tube or flashing LED.

Figure 6:
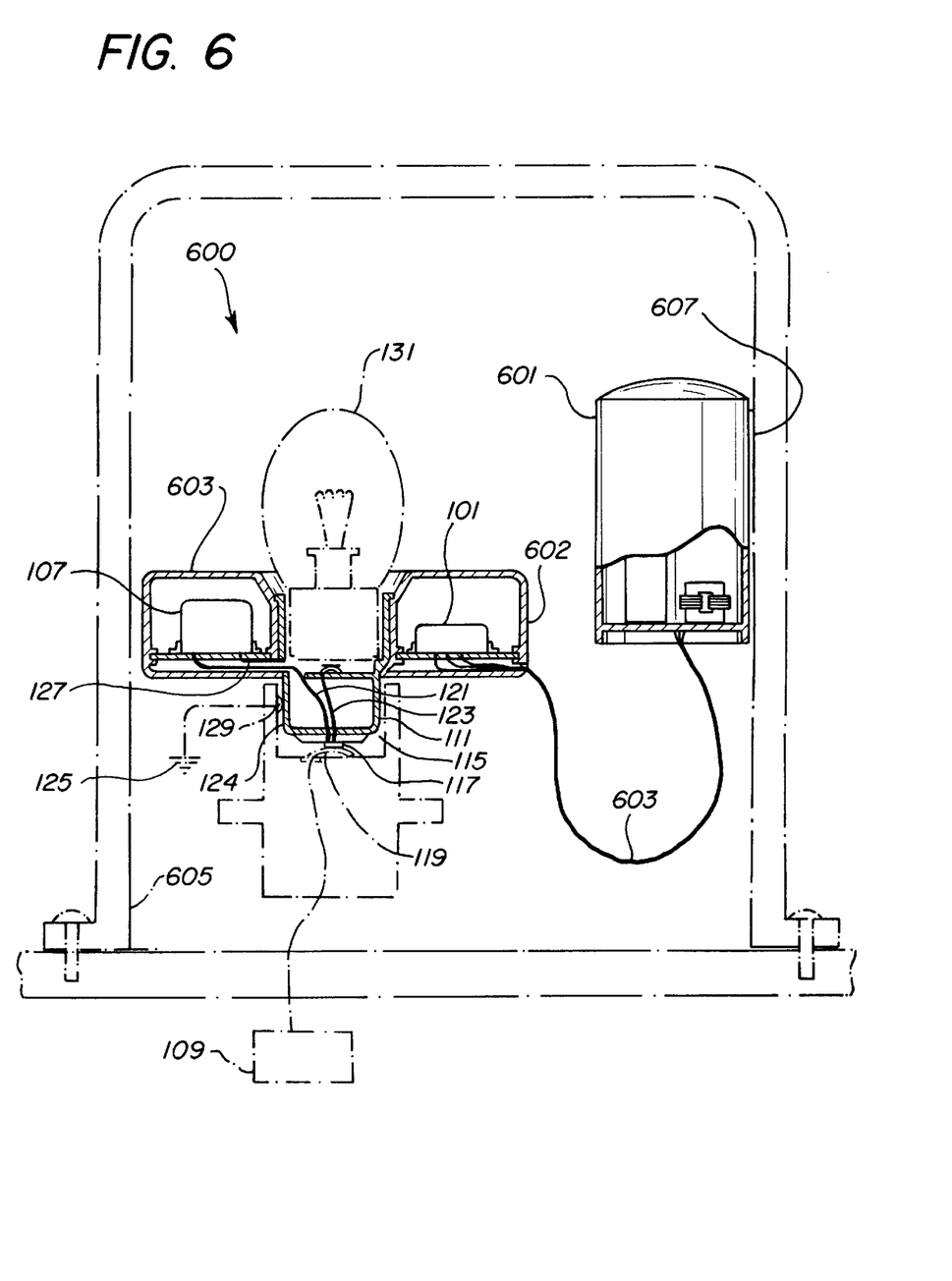
FIG. 6 is a partial cross section and partial fragmentary drawing of an embodiment of the vehicle warning device comprising an auxiliary enclosure containing at least one of the electronic components of the device, the enclosure attachable to the lens of the vehicle lamp and the lamp, vehicle lamp socket and lens shown in broken lines.

FIG. 6 is a partial cross section and partial fragmentary view of embodiment 600 of the vehicle warning device. In this embodiment, at least one of the electronic components of the warning device of FIG. 1 is located in a separate enclosure 601. The component or components in enclosure 601 are connected to adapter 602 by flexible cable 603. Current to power supply 107 is provided by adapter base supply contact 117 which engages vehicle socket supply contact 119 of vehicle lamp socket 115. Vehicle socket supply contact 119 is connected to vehicle lamp source 109. Conductor 121 connects adapter base supply contact 117 to power supply 107. The vehicle ground 125 return path for power supply 107 comprises conductor 127, base outer shell 124 and vehicle socket ground contact 129. Current to vehicle lamp 131 is also provided by adapter base supply contact 117 through conductor 123.

Locating vehicle warning device components in enclosure 601 allows adapter case 603 to be smaller and reduce interference with brake lens 605 or other lamp assembly parts (not shown). Separate enclosure 601 may be fixed to brake lens 605 by an adhesive strip 607. Alternatively, enclosure 601 may be attached to a reflector or the vehicle frame. In one embodiment, accelerometer 101 is located in adapter case 603 to maintain the automatic alignment of accelerometer 101 when base 111 is plugged into vehicle lamp socket 115. In other embodiments all of the electronic components of FIG. 1 are located in separate enclosure 601 eliminating the need for case 603. Separate enclosure 601 may be connected to a lamp base such as lamp base 503 of FIG. 5, eliminating the need for adapter 602.

Accordingly the reader will see that the VEHICLE WARNING DEVICE provides a device that provides visual warning to a driver of a following vehicle that an emergency braking condition is in progress. The device may be installed in new or used vehicles without wiring changes. The device provides the following additional advantages:

The device can be installed easily by the owner;
No mounting hardware is required;
The device may employ a variety of visual and/or auditory warning modes; and
The device is simple and low in cost.

Although the description above contains many specifications, these should not be construed as limiting the scope of the invention but as merely providing illustrations of some of the presently preferred embodiments of this invention. Thus the scope of the invention should be determined by the appended claims and their legal equivalents, rather than by the examples given.

We claim:

1. A vehicle warning device for an emergency braking condition, the device comprising:

a warning indicator comprising a deceleration sensor connected to an illumination component wherein the illumination component is activated upon sensing a predetermined deceleration of the vehicle; and a base insertable into a vehicle lamp socket, the base comprising a base supply contact attached to the base and disposed so that the base supply contact engages a vehicle socket supply contact of the vehicle lamp socket when the base is inserted into the vehicle lamp socket, the base supply contact electrically connected to the warning indicator;

whereby power to the deceleration sensor is provided by the base supply contact of the base, and power supply is disconnected from the deceleration sensor upon removal of the base from the vehicle lamp socket.

2. The vehicle warning device of claim 1 wherein the deceleration sensor is an accelerometer.

3. The vehicle warning device of claim 1 wherein the illumination component comprises a stroboscope.

4. The vehicle warning device of claim 1 comprising an adapter, the adapter comprising the base fixed to an adapter socket, the adapter socket sized to retain a vehicle lamp, the adapter further comprising a first electrical connection from the base supply contact to the warning indicator.

5. The vehicle warning device of claim 4 wherein the illumination component is a stroboscope and the adapter comprises a second electrical connection from the adapter base supply contact to an adapter socket supply contact disposed in the adapter socket to engage a lamp supply contact when the vehicle lamp is inserted into the adapter socket.

6. The vehicle warning device of claim 5 wherein the stroboscope comprises a flash tube, the flash tube connected to the adapter by a flexible cable.

7. The vehicle warning device of claim 5 wherein an electronic component of the warning device is disposed in an auxiliary case attached to the base by a flexible cable.

8. The vehicle warning device of claim 7 wherein the auxiliary case comprises a fastener for attaching the auxiliary case to the vehicle.

9. The vehicle warning device of claim 4 wherein the deceleration sensor is disposed in the adapter so that the deceleration sensor is aligned to sense braking of the vehicle when the base of the adapter is inserted into the vehicle lamp socket.

10. The warning device of claim 1 wherein the device is a vehicle brake lamp assembly insertable into a vehicle brake lamp socket, the vehicle lamp assembly comprising a brake actuated filament.

11. The warning device of claim 10 wherein the illumination component is a stroboscope actuated by the deceleration sensor, and the illumination component, deceleration sensor, base and brake actuated filament are an integral unit.

12. The warning device of claim 10 wherein the illumination component is a second filament actuated by the deceleration sensor, and the illumination component, deceleration sensor, base and brake actuated filament are an integral unit.

13. The warning device of claim 10 wherein the illumination component is the brake actuated filament actuated by the deceleration sensor, and the illumination component, acceleration sensor, base and brake actuated filament are an integral unit.

14. The warning device of claim 12 wherein the second filament is energized through a current pulsing component.

15. The warning device of claim 13 wherein the brake actuated filament is energized through a current pulsing component connected to the deceleration sensor, when the deceleration sensor senses a predetermined deceleration.

16. A vehicle warning device for an emergency braking condition, the device comprising:

a base insertable into a vehicle lamp socket;

a deceleration sensor disposed in the device, the deceleration sensor comprising a sensing axis which becomes aligned with a longitudinal axis of the vehicle when the base is inserted into the vehicle lamp socket whereby the deceleration sensor senses a braking action of the vehicle;

an illumination component connected to the deceleration sensor whereby the illumination component is activated by a predetermined deceleration sensed by the deceleration sensor;

the warning device powered by a base supply contact disposed on the base which makes electrical contact with a vehicle socket supply contact when the base is inserted into the vehicle lamp socket, and whereby power supply is disconnected from the deceleration sensor upon removal of the base from the vehicle lamp socket.

17. A vehicle warning device for an emergency braking condition, the device comprising:

a base insertable into a vehicle lamp socket, the base comprising a base supply contact attached to the base and disposed so that the base supply contact engages a vehicle socket supply contact of the vehicle lamp socket when the base is inserted into the vehicle lamp socket, the base supply contact electrically connected to a current pulsing component through a relay;

the relay connected to a deceleration sensor wherein the current pulsing component is activated upon a predetermined deceleration of the vehicle as sensed by the deceleration sensor and power to the current pulsing component is supplied by the base supply contact whereby power supply is disconnected from the current pulsing component upon removal of the base from the vehicle lamp socket.

18. The device of claim 17 comprising a lamp electrically connected to the current pulsing component.

19. The device of claim 17 comprising an adapter comprising the base and a lamp socket, the lamp socket comprising a lamp socket supply contact electrically connected to the current pulsing component.

* * * * *